US010855134B2

(12) United States Patent
Ishii et al.

(10) Patent No.: US 10,855,134 B2
(45) Date of Patent: Dec. 1, 2020

(54) MOTOR AND AIR CONDITIONING APPARATUS

(71) Applicant: Mitsubishi Electric Corporation, Tokyo (JP)

(72) Inventors: Hiroyuki Ishii, Tokyo (JP); Tomoaki Oikawa, Tokyo (JP); Mineo Yamamoto, Tokyo (JP); Hiroki Aso, Tokyo (JP); Junichiro Oya, Tokyo (JP); Yuto Urabe, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 148 days.

(21) Appl. No.: 16/090,856

(22) PCT Filed: Jul. 4, 2016

(86) PCT No.: PCT/JP2016/069768
§ 371 (c)(1),
(2) Date: Oct. 3, 2018

(87) PCT Pub. No.: WO2018/008058
PCT Pub. Date: Jan. 11, 2018

(65) Prior Publication Data
US 2019/0115798 A1  Apr. 18, 2019

(51) Int. Cl.
H02K 5/00 (2006.01)
H02K 5/173 (2006.01)
(Continued)

(52) U.S. Cl.
CPC ......... *H02K 5/1732* (2013.01); *F24F 1/0018* (2013.01); *H02K 5/08* (2013.01);
(Continued)

(58) Field of Classification Search
CPC ........ H02K 5/1732; H02K 5/08; F24F 1/0018
See application file for complete search history.

(56) References Cited

U.S. PATENT DOCUMENTS 4,798,984 A * 1/1989 Suzuki ................. H02K 5/225
310/68 C
6,987,338 B1 * 1/2006 Lavasser ................. A47L 5/12
15/412

(Continued)

FOREIGN PATENT DOCUMENTS

CN 101325351 A 12/2008
JP 2007-020348 A 1/2007
(Continued)

OTHER PUBLICATIONS

International Search Report of the International Searching Authority dated Oct. 4, 2016 for the corresponding International application No. PCT/JP2016/069768 (and English translation).

(Continued)

*Primary Examiner* — Alexander Talpalatski
(74) *Attorney, Agent, or Firm* — Posz Law Group, PLC

(57) ABSTRACT

A motor includes a rotor having a shaft, a stator provided so as to surround the rotor, a first bearing and a second bearing rotatably supporting the shaft and disposed at a distance from each other in an axial direction of the shaft, a molded resin part covering the stator and having a bearing support part supporting the first bearing, a bracket attached to the molded resin part, supporting the second bearing, and having conductivity, and a conductive member provided in contact with both of the bearing support and the bracket.

14 Claims, 10 Drawing Sheets

(51) Int. Cl.
*H02K 5/08* (2006.01)
*H02K 7/14* (2006.01)
*H02K 29/08* (2006.01)
*H02K 5/15* (2006.01)
*F24F 1/0018* (2019.01)
*H02K 7/08* (2006.01)
*H02K 5/24* (2006.01)

(52) U.S. Cl.
CPC ............... *H02K 5/15* (2013.01); *H02K 7/083* (2013.01); *H02K 7/14* (2013.01); *H02K 29/08* (2013.01); *H02K 5/24* (2013.01)

(56) References Cited

U.S. PATENT DOCUMENTS

| | | | |
|---|---|---|---|
| 10,250,109 B2 * | 4/2019 | Yamada | ................. H02K 11/00 |
| 2008/0042499 A1 | 2/2008 | Okada | |
| 2011/0234024 A1 * | 9/2011 | Hasegawa | ............ H02K 5/1732 |
| | | | 310/43 |
| 2012/0248911 A1 | 10/2012 | Ono et al. | |
| 2014/0183983 A1 * | 7/2014 | Huang | .................... H02K 3/28 |
| | | | 310/43 |
| 2016/0333833 A1 * | 11/2016 | Honda | ................... F02M 37/08 |

FOREIGN PATENT DOCUMENTS

| | | |
|---|---|---|
| JP | 2010-158152 A | 7/2010 |
| JP | 4718260 B2 | 7/2011 |
| JP | 2012-210064 A | 10/2012 |
| JP | 5338641 B2 | 11/2013 |
| JP | 2014-107998 A | 6/2014 |
| JP | 5741126 B2 | 7/2015 |
| JP | 2015-204692 A | 11/2015 |

OTHER PUBLICATIONS

Office Action dated Jan. 19, 2020 issued in corresponding CN patent application No. 201680087281.6 (and English translation).
Office Action dated Aug. 20, 2020 issued in corresponding CN patent application No. 201680087281.6 (and English translation).

* cited by examiner

MOTOR AND AIR CONDITIONING APPARATUS

CROSS REFERENCE TO RELATED APPLICATION

This application is a U.S. national stage application of International Patent Application No. PCT/JP2016/069768 filed on Jul. 4, 2016, the disclosure of which is incorporated herein by reference.

TECHNICAL FIELD

The present invention relates to a motor and an air conditioning apparatus having the motor.

BACKGROUND ART

When a motor is controlled by an inverter, a carrier frequency is generally set high in order to reduce noise caused by switching. Regarding control by the inverter, it is known that a high-frequency induced voltage (shaft voltage) is generated in a shaft of the motor, and the shaft voltage increases as a carrier frequency becomes higher. This causes an increase in a potential difference between an outer ring and an inner ring of a bearing supporting the shaft, and current is more likely to flow through the bearing. This causes damage (electrolytic corrosion) to raceway surfaces of the inner ring and the outer ring of the bearing and to rolling surfaces of rolling elements, and results in reduction in durability of the bearing.

Thus, Patent Reference 1 discloses a motor including two bearings supporting a shaft of a rotor, two conductive brackets fixing the two bearings to a stator, and a conductive pin electrically connecting the two brackets to each other. Further, the rotor is divided into an outer core and an inner core, and a dielectric layer is provided therebetween.

Further, Patent Reference 2 discloses a motor (molded motor) including two bearings supporting a shaft of a rotor, two conductive brackets fixing the two bearings to a stator, and a conductive plate electrically connecting the two brackets to each other.

PATENT REFERENCE

Patent Reference 1: Japanese Patent Application Publication No. 2010-158152 (see FIG. 2)
Patent Reference 2: Japanese Patent Application Publication No. 2012-210064 (see FIG. 3)

However, each of the above described conventional motors has a configuration in which two brackets are attached to the stator, and therefore, when attachment position accuracy of each bracket is low, coaxiality between the stator and the rotor may decrease, and noise and vibration may occur. Further, since two brackets are needed, the number of parts increases, and it results in a rise in manufacturing cost.

SUMMARY

The present invention is made to solve the above described problems, and an object of the present invention is to provide a motor capable of suppressing electrolytic corrosion, suppressing noise and vibration, and suppressing rise in manufacturing cost.

A motor of the present invention includes a rotor having a shaft, a stator provided so as to surround the rotor, a first bearing and a second bearing rotatably supporting the shaft and disposed at a distance from each other in an axial direction of the shaft, a molded resin part covering the stator and having a bearing support part supporting the first bearing, a bracket attached to the molded resin part, supporting the second bearing, and having conductivity, and a conductive member provided in contact with both of the bearing support part and the bracket.

According to the present invention, since the first bearing is supported by the bearing support part of the molded resin part and the second bearing is supported by the bracket, coaxiality between the stator and the shaft (that is, coaxiality between the stator and the rotor) can be enhanced, and thus noise and vibration can be suppressed. Further, since the conductive member contacts the bearing support part and the bracket, shaft current is less likely to flow through the first bearing and the second bearing, and occurrence of electrolytic corrosion can be suppressed. Furthermore, manufacturing cost can be reduced as compared with a case where two brackets are attached to the stator.

DETAILED DESCRIPTION

Embodiments of the present invention will be described in detail below with reference to the drawings. In this regard, these embodiments do not limit the present invention.

First Embodiment

Figure 1:
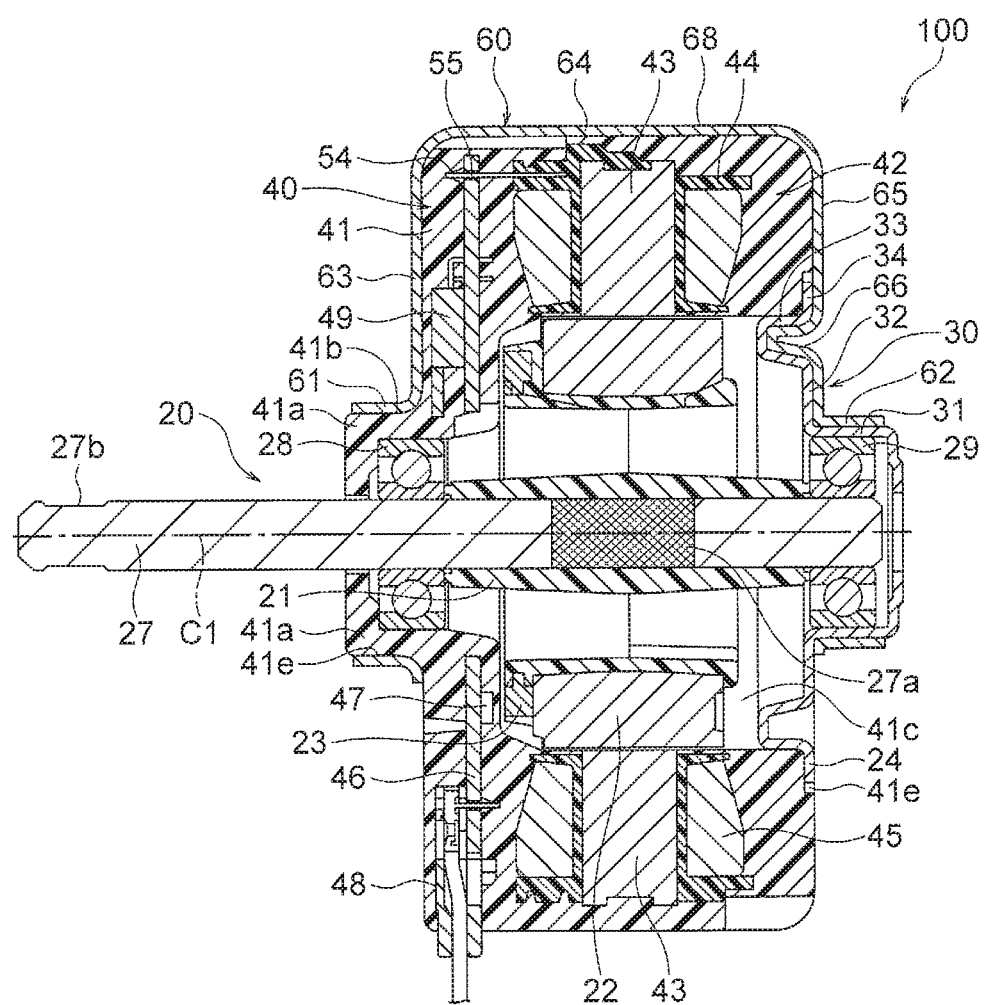
FIG. 1 is a sectional view illustrating a structure of a motor in the first embodiment of the present invention.

FIG. 1 is a sectional view illustrating a structure of a motor 100 in the first embodiment of the present invention. The motor 100 is, for example, a brushless DC motor or a stepping motor. The motor 100 includes a rotor 20 including a shaft 27, a stator 42 provided so as to surround the rotor 20, a molded resin part 41 covering the stator 42, and a conductive bracket 30 attached to the molded resin part 41. The stator 42 and the molded resin part 41 form a molded stator 40.

A direction of a central axis line C1 serving as a rotation axis of the shaft 27 will be simply referred to as an "axial direction" hereinafter. Further, a circumferential direction about the central axis line C1 of the shaft 27 will be simply referred to as a "circumferential direction" hereinafter and is indicated by an arrow R1 in the drawings (FIGS. 3, 5 and 6(B)). Further, a radial direction of the stator 42 and the rotor 20 about the central axis line C1 of the shaft 27 will be simply referred to as a "radial direction" hereinafter.

The shaft 27 projects from the molded stator 40 to the left in FIG. 1, and a fan impeller (FIG. 11), for example, is attached to an attachment part 27b formed on the projecting part. Accordingly, in the following description, the projection side (the left side in FIG. 1) of the shaft 27 will be referred to as a "load side", and an opposite side (the right side in FIG. 1) will be referred to as a ""counter-load side".

Figure 2:
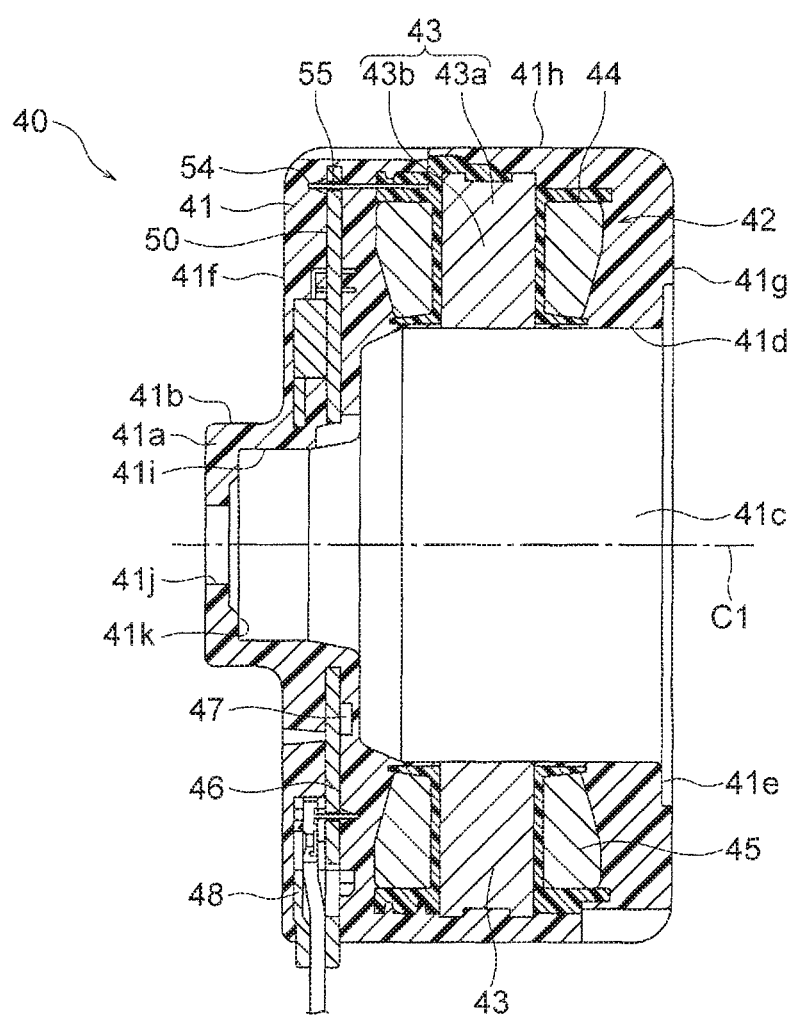
FIG. 2 is a sectional view illustrating a structure of a molded stator of the motor in the first embodiment.

FIG. 2 is a sectional view illustrating a structure of the molded stator 40. The molded stator 40 includes a stator 42 and a molded resin part 41, as described above. The stator 42 includes a stator core 43, an insulator 44 attached to the stator core 43, and a coil 45 wound around the stator core 43 with the insulator 44 interposed therebetween.

The stator core 43 includes a yoke 43a (see FIG. 3) annularly extending in the circumferential direction about the central axis line C1, and a plurality of teeth 43b (see FIG. 3) extending inward in the radial direction (toward the central axis line C1) from the yoke 43a. The stator core 43 is made by stacking a plurality of electromagnetic steel sheets in the axial direction.

The insulator 44 is made of a thermoplastic resin such as polybutylene terephthalate (PBT). The insulator 44 is formed by being molded integrally with the stator core 43 or fitting a thermoplastic resin molded body to the stator core 43. The coil 45 is wound around the tooth 43b of the stator core 43 with the insulator 44 interposed therebetween.

The above described stator 42 is formed by attaching the insulator 44 to (or molding the insulator 44 integrally with) the stator core 43 and winding the coil 45 around the insulator 44. The stator 42 and a board 46 which will be described next attached thereto will be referred to as a stator assembly 50.

Figure 3:
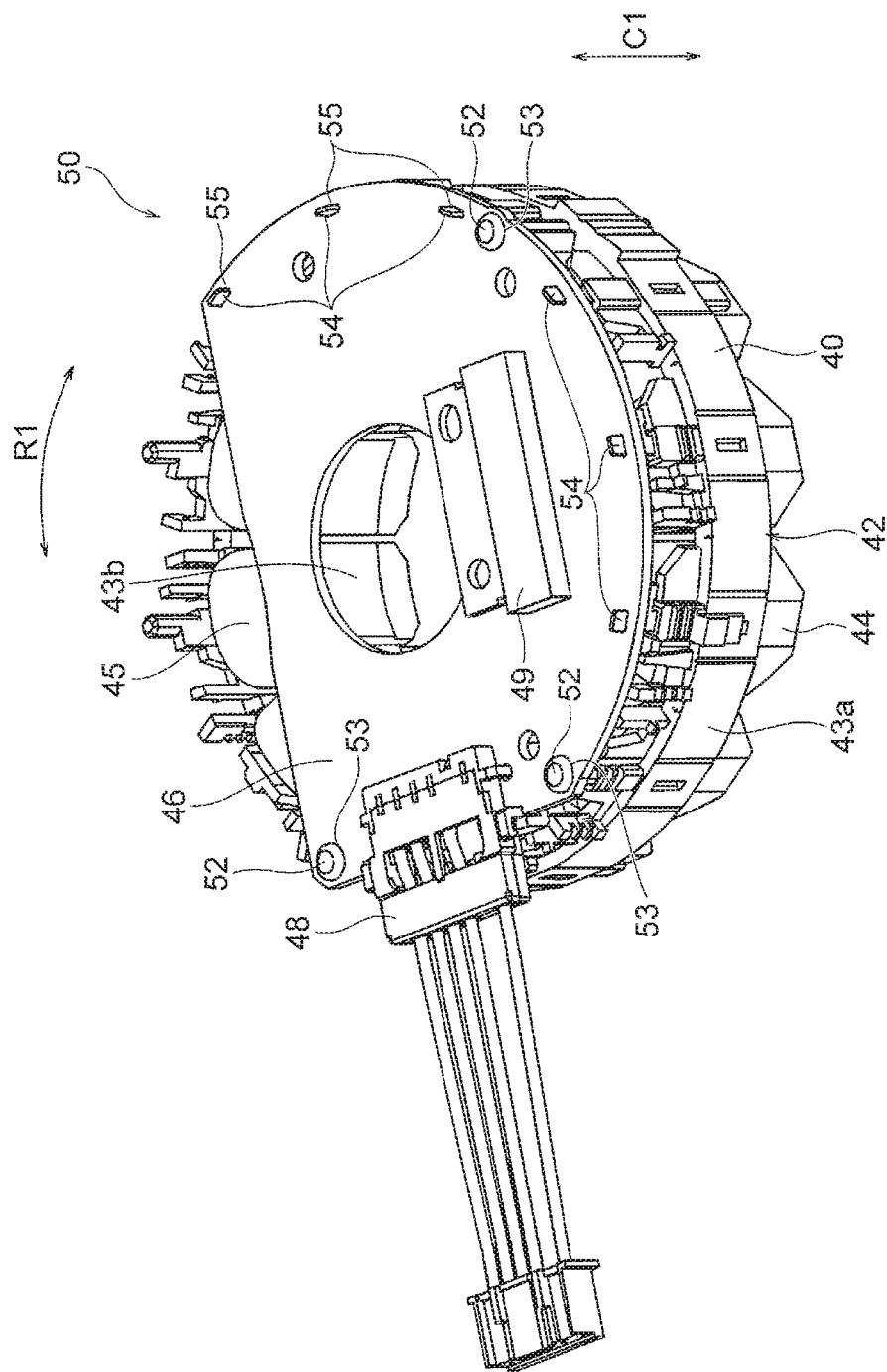
FIG. 3 is a perspective view illustrating a structure of a stator assembly in the first embodiment.

FIG. 3 is a perspective view illustrating a structure of the stator assembly 50. The board 46 is placed on one side of the stator core 43 in the axial direction, that is, on the load side (the upper side in FIG. 3) in this example. A plurality of holes 53 are formed along an outer periphery of the board 46. A plurality of protrusions 52 fit into the holes 53 of the board 46 are formed on the insulator 44. The board 46 is fixed to the insulator 44 by fitting the protrusions 52 of the insulator 44 into the holes 53 of the board 46 and deforming tips of the protrusions 52 by heat welding.

Power supply lead wires for supplying power to the coil 45, and sensor lead wires for transmitting a signal from a magnetic sensor 47 described later are wired on the board 46. Further, a driving element 49 for driving the motor 100, and a lead wire lead-out component 48 for leading the lead wires outside are mounted on the board 46.

A plurality of terminals 54 electrically connected to the coil 45 are attached to the insulator 44. A plurality of terminal insertion holes 55 engaging with the terminals 54 are formed on the board 46. The terminals 54 provided on the insulator 44 are electrically connected to the board 46 by being inserted into the terminal insertion holes 55 of the board 46 and joined by soldering.

A magnetic sensor 47 (FIG. 1) is disposed on a back surface side of the board 46. The magnetic sensor 47 constitutes a part of a sensor circuit detecting a rotational position of the rotor 20. The magnetic sensor 47 is disposed so as to face a sensor magnet 23 (described later) of the rotor 20. The magnetic sensor 47 detects a position (rotational position) of the rotor 20 in the circumferential direction based on changes in magnetic flux (N/S) from the sensor magnet 23, and outputs a detection signal.

The detection signal from the magnetic sensor 47 is input into a driving circuit provided on the board 46 or outside the motor 100, via the sensor lead wires provided on the board 46. When the motor 100 is a brushless DC motor, the driving circuit controls current to be supplied to the coil 45 in accordance with the rotational position of the rotor 20 relative to the stator 42, based on the detection signal from the magnetic sensor 47. Thus, the motor 100 can be driven with high efficiency and low noise.

With reference to FIG. 2 again, the molded resin part 41 is formed so as to cover the whole of the stator 42 (the stator core 43, the insulator 44, and the coil 45) and the board 46. The molded resin part 41 is made of a thermosetting resin such as unsaturated polyester. The molded resin part 41 includes a cylindrical outer circumferential surface 41h located outside the stator 42 in the radial direction, a load-side end face 41f corresponding to an end face of the stator 42 on the load side (the left side in the figure), and a counter-load-side end face 41g corresponding to an end face of the stator 42 on the counter-load side (the right side in the figure).

A bearing support part 41a as a first bearing support part is formed at a center of the load-side end face 41f of the molded resin part 41 in the radial direction, and axially projects. An inner circumferential surface 41i having a cylindrical shape about the central axis line C1 is formed on an inner side of the bearing support part 41a, and an outer circumferential surface 41b having a cylindrical shape about the central axis line C1 is formed on an outer side of the bearing support part 41a. A hole 41j through which the shaft 27 is inserted is formed at a radial center of a tip end of the bearing support part 41a. A contact surface 41k perpendicular to the axial direction is formed around the hole 41j of the bearing support part 41a.

The molded resin part 41 includes an insertion hole 41c opened on the counter-load-side end face 41g side. The insertion hole 41c is a part in which the rotor 20 is housed, and includes a cylindrical inner circumferential surface 41d facing an outer circumferential surface of the rotor 20. An inner space of the insertion hole 41c is continuous with an inner space of the bearing support part 41a in the axial direction. On the counter-load-side end face 41g, an annular step portion 41e is formed so as to surround the insertion hole 41c.

When the molded resin part 41 is formed, the stator assembly 50 (FIG. 3) obtained by attaching the board 46 to the stator 42 (the stator core 43, the insulator 44, and the coil 45) is placed in a mold. Then, a constituent material (for example, a thermosetting resin such as unsaturated polyester resin) of the molded resin part 41 is injected into the mold and heated, so that the molded resin part 41 is integrally molded with the stator assembly 50.

In this regard, a strength of the board 46 is relatively low, and therefore low-pressure molding is desirable. Unsaturated polyester resin can be molded under low pressure, and therefore is especially desirable as a constituent material of the molded resin part 41. Further, unsaturated polyester has low shrinkage (and accordingly has small change in dimension) and makes it easy to obtain high dimensional accuracy, and therefore unsaturated polyester is suitable for forming the bearing support part 41a.

The mold is desirably provided with a protrusion which contacts a part of the board 46 when mold clamping is performed in a state where the stator assembly 50 is placed in the mold. With this arrangement, deformation of the board 46 by molding pressure can be suppressed, and detachment of a soldered joint portion of the board 46 can be prevented.

Figure 4:
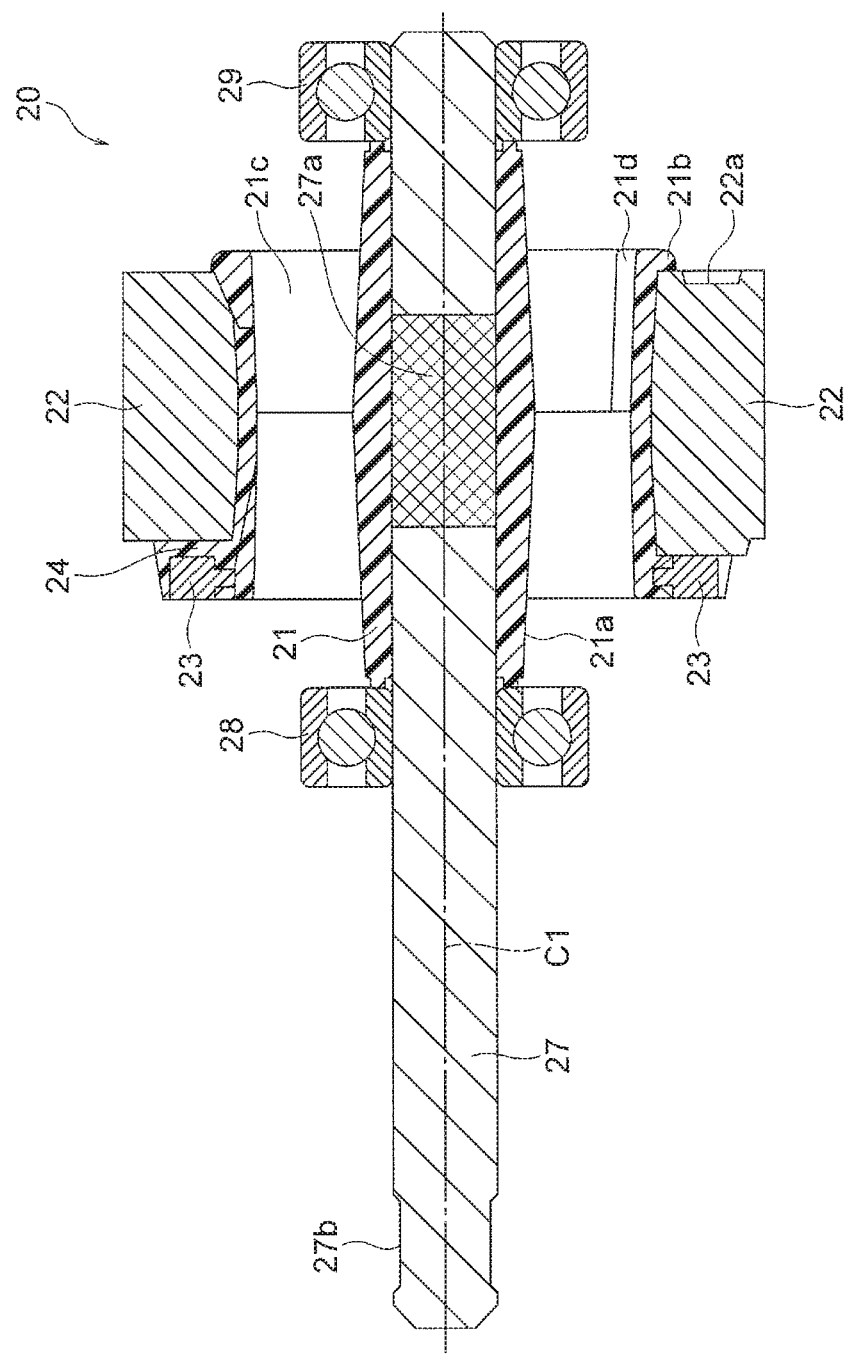
FIG. 4 is a sectional view illustrating a structure of a rotor in the first embodiment.

FIG. 4 is a sectional view illustrating a structure of the rotor 20. The rotor 20 includes a shaft 27 serving as a rotation shaft, a magnet 22 disposed on an outer side of the shaft 27 in the radial direction, a sensor magnet 23 disposed adjacent to the magnet 22 in the axial direction, and a resin part 21 supporting the magnet 22 and the sensor magnet 23. The shaft 27 is rotatably supported by a first bearing 28 and a second bearing 29. The first bearing 28 and the second bearing 29 are both roller bearings and are disposed at a distance from each other in the axial direction.

The magnet 22 is a magnet having an annular shape about the central axis line C1 and is made of a thermoplastic resin molded body containing a magnet powder. The magnet 22 is magnetized so that opposite magnetic poles (north and south poles) alternate in the circumferential direction. In this example, the magnet 22 has eight magnetic poles. In other words, the rotor 20 has eight magnetic poles. However, the number of magnetic poles is not limited to 8. Further, the magnet 22 is not limited to a thermoplastic resin molded body containing a magnet powder and may be, for example, a sintered magnet.

A base 24 which holds the sensor magnet 23 is provided at one end of the magnet 22 in the axial direction, that is, the end on the load side (the left side in the figure) in this example. Eight recesses 22a which are evenly spaced in the circumferential direction are formed at the other end of the magnet 22 in the axial direction, that is, the end on the counter-load side (the right side in the figure) in this example. Not shown gates for injecting a thermoplastic resin constituting the magnet 22 are formed in the recesses 22a. The depth of the recess 22a from the end face of the magnet 22 on the counter-load side is set to a depth so that a not shown gate-treated portion does not stick out. The recesses 22a are disposed between the magnetic poles in the circumferential direction, but they may be disposed at centers of the magnetic poles.

The sensor magnet 23 is an annular magnet made of a thermoplastic resin molded body containing a magnet powder. The sensor magnet 23 is magnetized so that opposite magnetic poles (north and south poles) alternate in the circumferential direction. The number of magnetic poles, polarities, and phases in the circumferential direction of the sensor magnet 23 are the same as those of the magnet 22. The sensor magnet 23 contacts the base 24 and is held by the resin part 21. In this regard, the sensor magnet 23 is not limited to a thermoplastic resin molded body containing a magnet powder and may be, for example, a sintered magnet.

The resin part 21 includes a sleeve-like inner cylindrical body 21a attached to an outer circumferential surface of the shaft 27, an annular outer cylindrical body 21b disposed on an outer side of the inner cylindrical body 21a in the radial direction, and a plurality of (for example, eight) ribs 21c connecting the inner cylindrical body 21a and the outer cylindrical body 21b. The resin part 21 is made of a thermoplastic resin (for example, polybutylene terephthalate) molded body.

Figure 5:
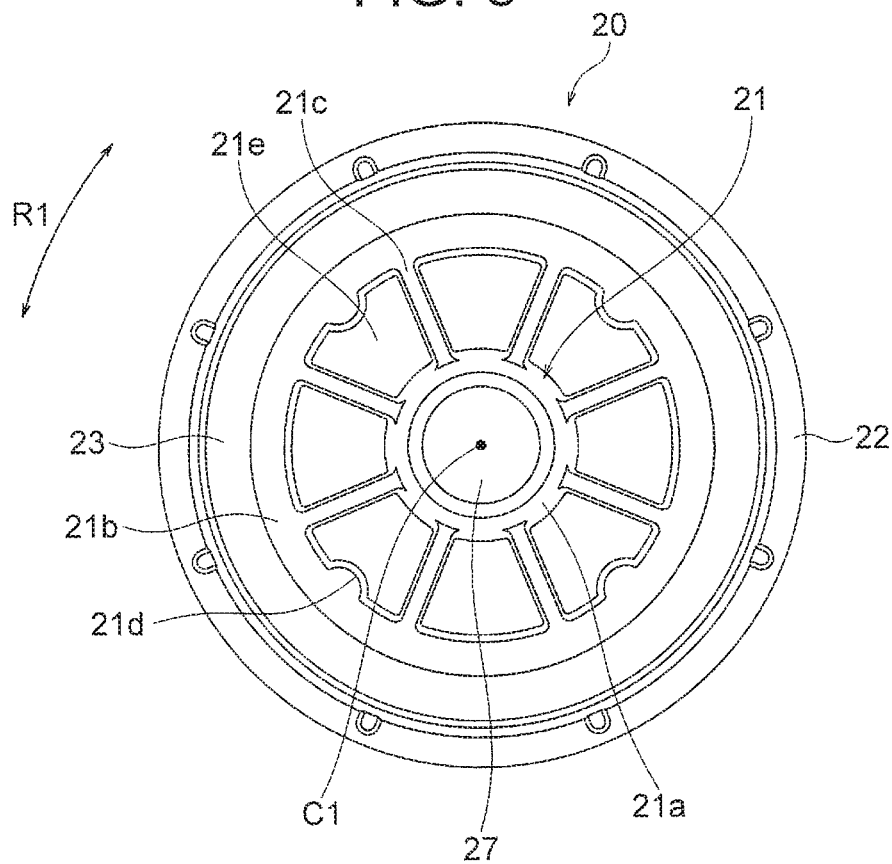
FIG. 5 is a front view illustrating a structure of the rotor illustrated in FIG. 4.

FIG. 5 is a front view illustrating the rotor 20 as viewed from the load side. The shaft 27 penetrates the inner cylindrical body 21a of the resin part 21. The ribs 21c are arranged at regular intervals in the circumferential direction about the central axis line C1 of the shaft 27 and extend radially from the inner cylindrical body 21a outward in the radial direction. Hollow portions 21e are formed between ribs 21c adjacent to each other in the circumferential direction. The number of the ribs 21c is not limited to 8.

With reference to FIG. 4 again, the outer cylindrical body 21b is formed so as to cover both end faces of the magnet 22 in the axial direction and holds the magnet 22 so that the magnet 22 is not detached therefrom. The resin constituting the outer cylindrical body 21b also enters into the recesses 22a and a periphery of the base 24 of the magnet 22. This restrains inclination of the magnet 22 with respect to a plane perpendicular to the central axis line C1.

A knurled part 27a is formed on the outer circumferential surface of the shaft 27. The knurled part 27a comes into contact with an inner circumferential surface of the inner cylindrical body 21a of the resin part 21 to prevent the shaft 27 from slipping with respect to the resin part 21. An attachment part 27b to which, for example, a fan impeller is attached is formed at the load-side end of the shaft 27.

The first bearing 28 is placed on one side (load side) of the rotor 20 in the axial direction and supported by the bearing support part 41a of the molded resin part 41. Further, the second bearing 29 is placed on the other side (counter-load side) of the rotor 20 in the axial direction and supported by the bracket 30 which will be described next.

The bracket 30 is disposed so as to cover the insertion hole 41c of the molded resin part 41, as illustrated in FIG. 1. More specifically, the bracket 30 is press-fitted into the insertion hole 41c of the molded resin part 41 and engages with the insertion hole 41c.

Figure 6A:
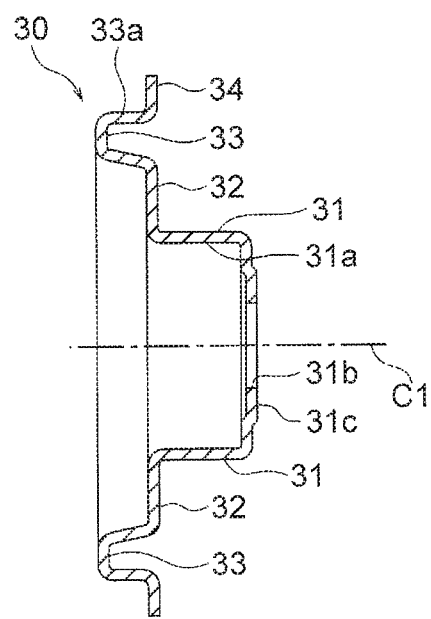
FIG. 6(A) and FIG. 6(B) are a sectional view and a perspective view illustrating a structure of a bracket of the motor in the first embodiment.
Figure 6B:
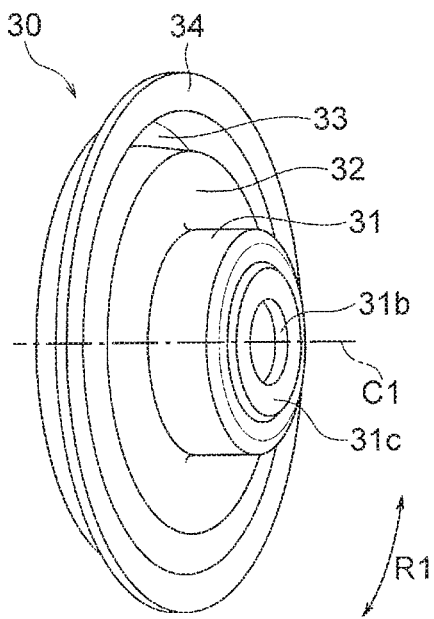

FIG. 6(A) is a sectional view illustrating a structure of the bracket 30 in the first embodiment. FIG. 6(B) is a perspective view illustrating the structure of the bracket 30. The bracket 30 is made of a conductive material such as a metal. The metal is, for example, a galvanized steel sheet, but is not limited to a galvanized steel sheet.

The bracket 30 has a shape of a solid of revolution about the central axis line C1. The bracket 30 includes a cylindrical part 31 as a second bearing support part disposed at the center in the radial direction, and a disk part 32 extending around the cylindrical part 31.

An inner circumferential surface 31a having a cylindrical shape about the central axis line C1 is formed on an inner side of the cylindrical part 31, and an outer circumferential surface having a cylindrical shape about the central axis line C1 is formed on an outer side of the cylindrical part 31. A wall 31c is formed to cover a tip end (right end in FIG. 6(A)) of the cylindrical part 31, and a hole 31b is formed at a center of the wall 31c.

The disk part 32 extends in a plane perpendicular to the central axis line C1. A groove part 33 serving as an engaged part is formed in the disk part 32. The groove part 33 is annularly formed in the circumferential direction about the central axis line C1. The groove part 33 projects from the disk part 32 to the insertion hole 41c side (to the left in FIG. 6(A)) of the molded resin part 41. The groove part 33 has, for example, a rectangular cross-section. An outer periphery 33a of the groove part 33 is press-fitted into the insertion hole 41c of the molded resin part 41. Therefore, the outer diameter of the outer periphery 33a of the groove part 33 is larger than an inner diameter of the insertion hole 41c by a press-fit margin (amount of elastic deformation caused by press fitting).

An annular extension part 34 is formed on an outer side of the groove part 33 of the disk part 32 in the radial direction. The extension part 34 is a part contacting the step portion 41e (FIG. 2) formed around the insertion hole 41c of the molded resin part 41.

Figure 7:
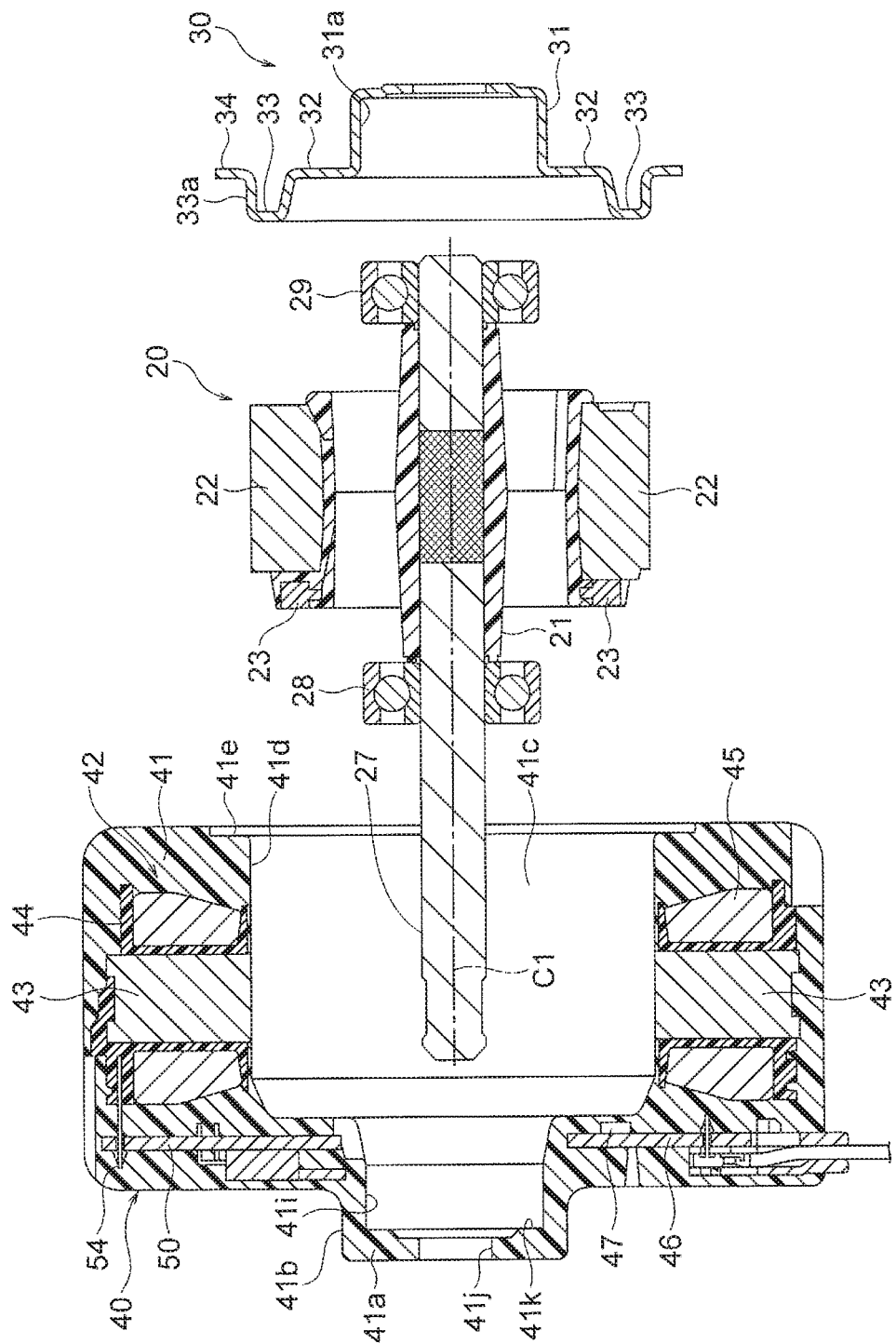
FIG. 7 is a view illustrating a relationship among the molded stator, the rotor, and the bracket in the first embodiment.

FIG. 7 is a view illustrating a relationship among the molded stator 40, the rotor 20, and the bracket 30. The rotor 20 is inserted from one side (the right side in FIG. 7) in the axial direction into the insertion hole 41c of the molded resin part 41. A tip end of the shaft 27 of the rotor 20 penetrates the hole 41j of the molded resin part 41. The first bearing 28 contacts the contact surface 41k of the bearing support part 41a and is supported in the bearing support part 41a. Further, an outer circumferential surface of an outer ring of the first bearing 28 contacts the inner circumferential surface 41i of the bearing support part 41a.

In a state where the rotor 20 is inserted into the insertion hole 41c of the molded resin part 41, the outer circumferential surface of the magnet 22 faces the inner circumferential surface of the stator core 43 in the radial direction. Further, the sensor magnet 23 faces the magnetic sensor 47 in the axial direction. The second bearing 29 projects from the insertion hole 41c of the molded resin part 41 in the axial direction.

The bracket 30 is attached to the molded stator 40 by press-fitting the outer periphery 33a of the groove part 33 into the insertion hole 41c of the molded resin part 41. In this state, with an elastic force of the bracket 30 made of metal, the outer periphery 33a of the groove part 33 is pressed against the inner circumferential surface 41d of the molded resin part 41, and the bracket 30 is firmly held. In this state, the second bearing 29 is supported in the cylindrical part 31 of the bracket 30. In other words, an outer circumferential surface of an outer ring of the second bearing 29 contacts the inner circumferential surface 31a of the cylindrical part 31.

The molded resin part 41 including the bearing support part 41a is molded integrally with the stator 42 (the stator core 43, the insulator 44, and the coil 45). Therefore, high coaxiality (concentricity) is obtained between the stator 42 and the bearing support part 41a. Consequently, high coaxiality is obtained between the stator 42 and the rotor 20, and noise and vibration are suppressed. Further, as compared with a case where a bearing support part is formed separately from the molded resin part 41, the number of parts is reduced, and the manufacturing cost is reduced.

Figure 8:
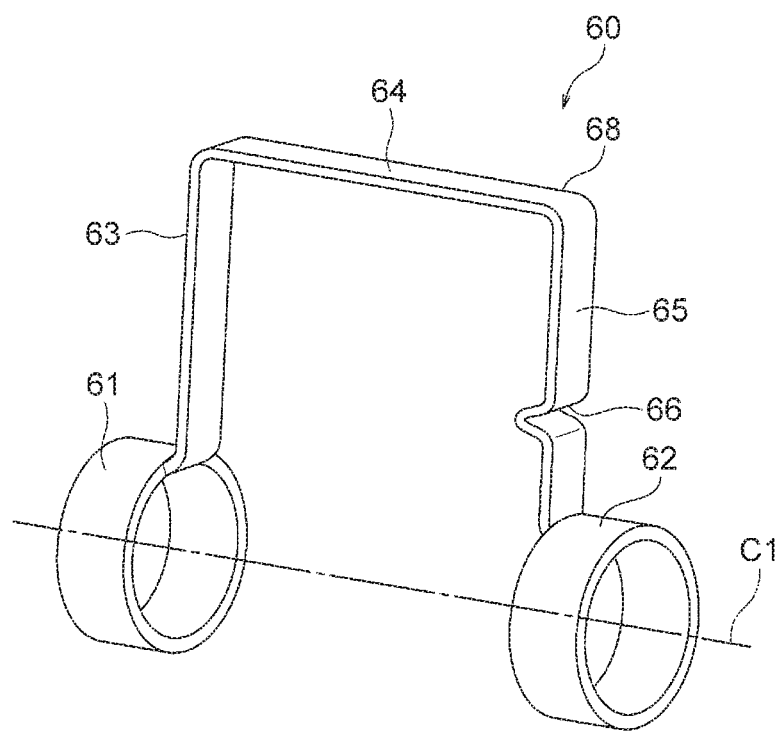
FIG. 8 is a view schematically illustrating a shape of a conductive member in the first embodiment.

Next, a conductive member 60 connecting the bearing support part 41a of the molded stator 40 and the bracket 30 will be described. The conductive member 60 is made of an elastically deformable conductive member such as a metal. FIG. 8 is a perspective view schematically illustrating a shape of the conductive member 60.

The conductive member 60 includes an annular first conductive ring (first annular part) 61 which contacts the outer circumferential surface 41b (FIG. 2) of the bearing support part 41a of the molded stator 40, a second conductive ring (second annular part) 62 which contacts the outer circumferential surface (FIG. 6) of the cylindrical part 31 of the bracket 30, and a connecting part 68 electrically connecting them to each other. The first conductive ring 61, the second conductive ring 62, and the connecting part 68 are formed integrally, as illustrated in FIG. 8. In this example, the conductive member 60 has a configuration in which the first conductive ring 61 and the second conductive ring 62 are formed at both ends of the connecting part 68 made by bending a strip-shaped member.

The first conductive ring 61 is formed to have an annular shape about the central axis line C1. A length of the first conductive ring 61 in the axial direction is equal to or slightly shorter than a length of the bearing support part 41a of the molded stator 40 in the axial direction. The second conductive ring 62 is also formed to have an annular shape about the central axis line C1. A length of the second conductive ring 62 in the axial direction is equal to or slightly shorter than a length of the cylindrical part 31 of the bracket 30 in the axial direction.

The connecting part 68 extends from the first conductive ring 61 to the second conductive ring 62 along both end faces 41f and 41g and the outer circumferential surface 41h of the molded resin part 41. More specifically, the connecting part 68 includes a first connecting part 63 extending from the first conductive ring 61 along the load-side end face 41f (FIG. 2) of the molded resin part 41, a second connecting part 64 extending along the outer circumferential surface 41h (FIG. 2) of the molded resin part 41, and a third connecting part 65 extending to the second conductive ring 62 along the counter-load-side end face 41g (FIG. 2) of the molded resin part 41. An engaging part 66 which engages with the groove part 33 of the bracket 30 is formed on the third connecting part 65. The engaging part 66 is, for example, a bent portion formed by bending a part of the third connecting part 65, but the engaging part 66 is not limited to a bent portion.

In FIG. 1, when the conductive member 60 is attached to the molded stator 40, the bracket 30 is press-fitted into the insertion hole 41c of the molded resin part 41 first, and then the first conductive ring 61 is fitted onto the outer periphery of the bearing support part 41a and the second conductive ring 62 is fitted onto the outer periphery of the cylindrical part 31 of the bracket 30, while the connecting part 68 is elastically deformed.

When the first conductive ring 61 is fitted onto the bearing support part 41a of the molded resin part 41 and the second conductive ring 62 is fitted onto the cylindrical part 31 of the bracket 30, the connecting part 68 is pressed against the outer circumferential surface 41h of the molded resin part 41. Further, the engaging part 66 of the conductive member 60 engages with the groove part 33 of the bracket 30. Furthermore, with the elastic force of the conductive member 60, the extension part 34 of the bracket 30 is pressed against the step portion 41e of the molded resin part 41.

Since the engaging part 66 of the conductive member 60 engages with the groove part 33 of the bracket 30, the connecting part 68 can be attached to the molded stator 40 without being raised therefrom, and an appearance can thus be enhanced. Further, a variation of a length of the connecting part 68 can be absorbed by a depth of engagement between the engaging part 66 of the conductive member 60 and the groove part 33 of the bracket 30.

Next, an effect of preventing electrolytic corrosion (damage to the bearings) in the first embodiment will be described. Since the first conductive ring 61 contacts the outer circumferential surface 41b of the bearing support part 41a of the molded stator 40, high-frequency current flowing through the bearing support part 41a flows into the first conductive ring 61. Further, since the second conductive ring 62 and the bracket 30 contact each other, the first conductive ring 61 and the bracket 30 are electrically connected to each other via the connecting part 68.

Since each of the bracket 30, the second conductive ring 62, and the second bearing 29 has conductivity, the second conductive ring 62 and the second bearing 29 are electrically connected to each other by contact between the second conductive ring 62 and the bracket 30. Since the first conductive ring 61 and the second conductive ring 62 are electrically connected to each other via the connecting part 68, the first bearing 28 and the second bearing 29 are electrically connected to each other via the conductive member 60 for high-frequency current.

When the motor 100 is driven by an inverter, a carrier frequency of the inverter is often set higher than audible frequencies in order to suppress noise caused by switching. However, if the carrier frequency becomes higher, a voltage (shaft voltage) caused by high-frequency induction increases, and high-frequency current (shaft current) is generated.

Figure 9:
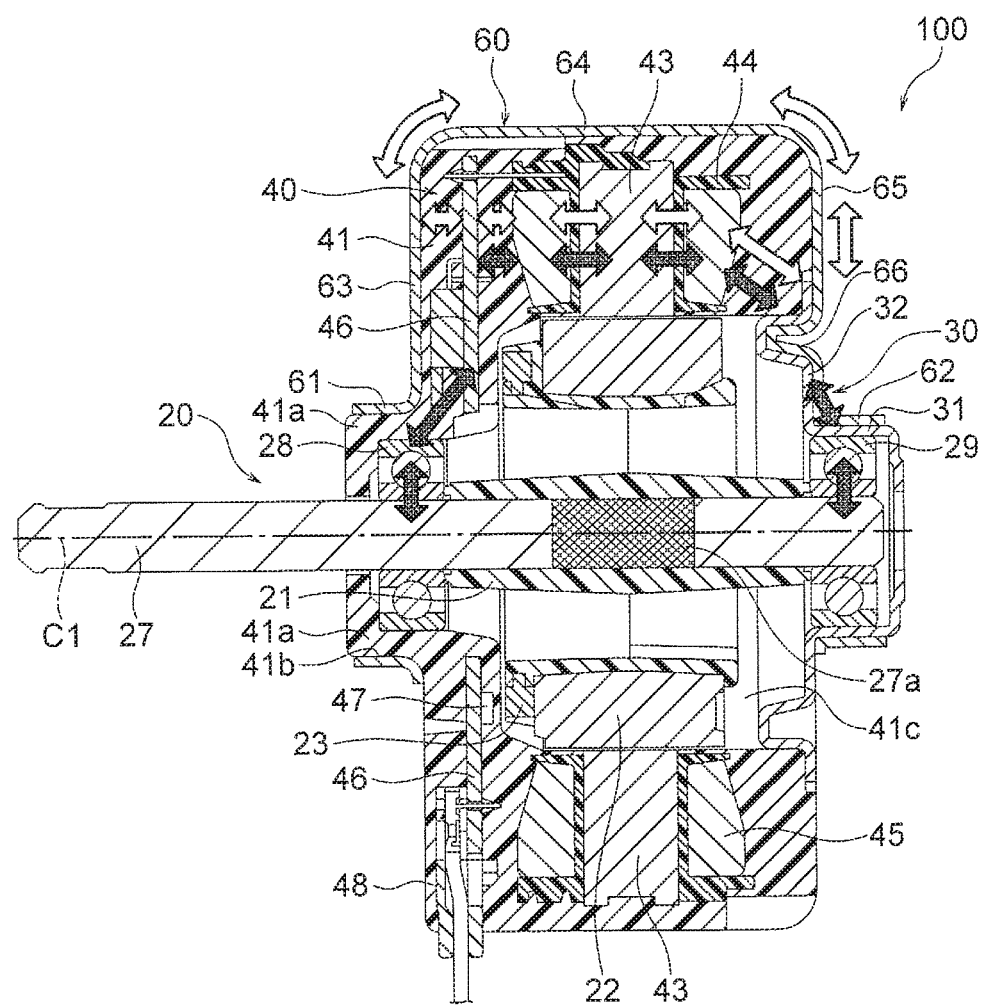
FIG. 9 is a schematic view for explaining a current path in the motor.

FIG. 9 is a schematic view for explaining a path of the shaft current in the motor 100. In this explanation, the board 46 serving as a source for supplying current to the coil 45 is assumed to be a starting point of the shaft current. When the molded stator 40 is not provided with the conductive member 60, the shaft current flows from the board 46, flows through the coil 45, the stator core 43, the coil 45, the bracket 30, the second bearing 29, the shaft 27 and the first bearing 28 in this order, and returns to the board 46, as indicated by black arrows in FIG. 9. In this manner, the current flows through the first bearing 28 and the second bearing 29, and therefore electrolytic corrosion may occur.

In contrast, when the molded stator 40 is provided with the conductive member 60, the shaft current flows from the board 46, flows through the coil 45, the stator core 43, the coil 45, the bracket 30 and the conductive member 60 in this order, and returns to the board 46, as indicated by white arrows in FIG. 9. Thus, the current is less likely to flow through the first bearing 28 and the second bearing 29, and electrolytic corrosion can be suppressed.

In particular, since the conductive member 60 contacts the outer circumferential surface 41b of the bearing support part 41a of the molded resin part 41, the first bearing 28 and the second bearing 29 are electrically connected to each other via the conductive member 60 for the shaft current (high-frequency current), and a potential difference is less likely to occur between the first bearing 28 and the second bearing 29. This makes it harder for the current to flow through the first bearing 28 and the second bearing 29, and electrolytic corrosion can be suppressed.

As described above, according to the first embodiment of the present invention, since the molded resin part 41 covering the stator 42 is provided with the bearing support part 41a supporting the first bearing 28, the bracket 30 supporting the second bearing 29 is attached to the molded stator 40, and the conductive member 60 is provided in contact with the bearing support part 41a and the bracket 30, current flowing through the first bearing 28 and the second bearing 29 can be reduced. Consequently, electrolytic corrosion caused by the current flowing through the first bearing 28 and the second bearing 29 can be suppressed.

Further, since the bearing support part 41a is formed in the molded resin part 41, high coaxiality is obtained between the stator 42 and the shaft 27. Consequently, high coaxiality is obtained between the stator 42 and the rotor 20, the rotation accuracy of the motor 100 can be enhanced, and noise and vibration can be suppressed. In addition, as compared with a case where the bearing support part 41a is formed separately from the molded resin part 41, the number of parts can be reduced, and the manufacturing cost can be reduced.

Further, since the molded resin part 41 includes the insertion hole 41c for the rotor 20 and the bracket 30 is attached to the insertion hole 41c, the motor 100 can be easily assembled by inserting the rotor 20 into the insertion hole 41c and attaching the bracket 30 to the insertion hole 41c.

Further, since the conductive member 60 includes the first conductive ring 61 contacting the outer circumferential surface 41b of the bearing support part 41a, the bearing support part 41a and the first conductive ring 61 can sufficiently contact each other. Thus, the shaft current flowing through the bearing support part 41a can be made to flow not through the first bearing 28 but through the conductive member 60.

Further, since the conductive member 60 includes the second conductive ring 62 contacting the outer circumferential surface of the cylindrical part 31 of the bracket 30, the cylindrical part 31 and the second conductive ring 62 can sufficiently contact each other. Thus, the shaft current flowing through the bracket 30 can be made to flow not through the second bearing 29 but through the conductive member 60.

Further, since the conductive member 60 includes the connecting part 68 connecting the first conductive ring 61 and the second conductive ring 62 to each other, the first conductive ring 61 and the second conductive ring 62 can be electrically connected to each other with a simple structure.

Further, since the connecting part 68 of the conductive member 60 is provided so as to extend along the outer circumferential surface 41h of the molded resin part 41, the conductive member 60 can be attached to the molded resin part 41 from outside, and the attachment of the conductive member 60 can be performed easily.

Further, since the engaging part 66 of the conductive member 60 engages with the groove part 33 (engaged part) of the bracket 30, the conductive member 60 can be held so that the conductive member 60 is not detached from the molded stator 40.

Further, since the groove part 33 of the bracket 30 is formed to project toward inside of the insertion hole 41c of the molded resin part 41, the groove part 33 can also serve as a member for fixing the bracket 30 to the insertion hole 41c, and thus a structure of the bracket 30 can be simplified.

Further, since both the conductive member 60 and the bracket 30 are made of a metal, the current flowing through the first bearing 28 and the second bearing 29 can be effectively reduced.

Further, since the molded resin part 41 is made of a thermosetting resin, the molded resin part 41 can be molded integrally with the stator assembly 50 (including the board 46 having a relatively low strength) with a relatively low molding pressure.

Further, since the rotor 20 includes the resin part 21 attached to the shaft 27 and the magnet 22 supported by the resin part 21, the shaft current passing through the rotor 20 can be suppressed, as compared with a case where a rotor core made of electromagnetic steel sheets is used.

In this regard, the bearing support part 41a of the molded resin part 41 is placed on the load side while the bracket 30 is placed on the counter-load side in this example, but this embodiment is not limited to such an arrangement. In other words, the bearing support part 41a of the molded resin part 41 may be placed on the counter-load side while the bracket 30 is placed on the load side.

Further, the rotor 20 is not limited to a structure in which the magnet 22 and the sensor magnet 23 are attached to the resin part 21. A rotor core made of electromagnetic steel sheets may be used instead of the resin part 21. However, paths for the shaft current is fewer when the resin part 21 is used, and therefore use of the resin part 21 is advantageous in suppressing the shaft current.

Second Embodiment

Figure 10:
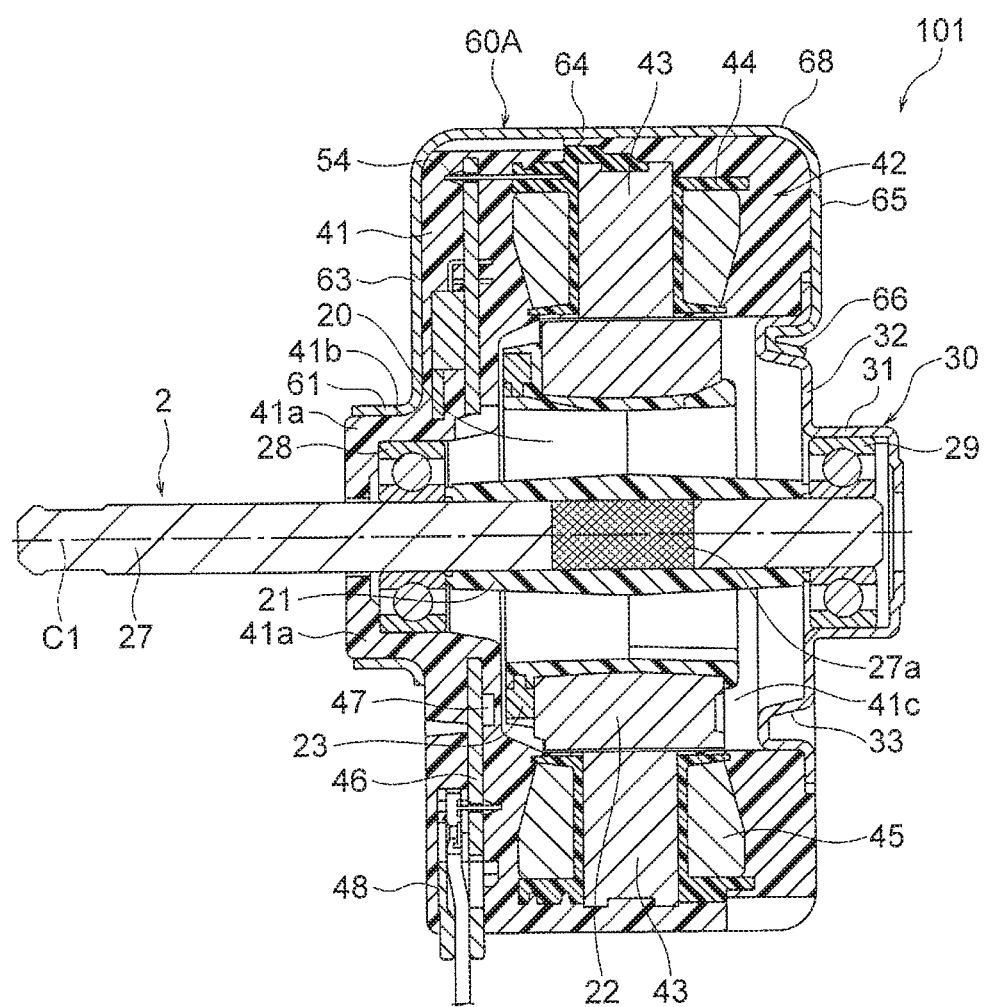
FIG. 10 is a sectional view illustrating a structure of a motor in the second embodiment.

Next, the second embodiment of the present invention will be described. FIG. 10 is a sectional view illustrating a structure of a motor 101 in the second embodiment. The motor 101 in the second embodiment is different from the motor 100 (FIG. 1) in the first embodiment in a structure of a conductive member 60A. In FIG. 10, components which are the same as those in the first embodiment are denoted by the same reference numerals.

The conductive member 60A in the second embodiment includes a first conductive ring 61 and a connecting part 68 (a first connecting part 63, a second connecting part 64, and a third connecting part 65) but includes no second conductive ring (FIG. 8) described in the first embodiment. The third connecting part 65 of the conductive member 60A includes an engaging part 66 similar to that in the first embodiment, but the engaging part 66 serves as a terminal end of the third connecting part 65.

Each of the conductive member 60A and the bracket 30 has conductivity. Therefore, even when the conductive member 60A does not reach the cylindrical part 31 of the bracket 30, the conductive member 60A and the second bearing 29 are electrically connected to each other as long as the conductive member 60A contacts at least a part of the bracket 30.

For this reason, even when the conductive member 60A in the second embodiment is used, the shaft current flows from the board 46, flows through the coil 45, the stator core 43, the coil 45, the bracket 30 and the conductive member 60A in this order, and returns to the board 46. Consequently, current flowing through the first bearing 28 and the second bearing 29 can be reduced, and occurrence of electrolytic corrosion can be suppressed. Further, since the conductive member 60A includes the engaging part 66 engaging with the groove 33 in the bracket 30, the conductive member 60A can be fixed to the molded stator 40 so that the conductive member 60A is not detached therefrom.

Other components are the same as described in the first embodiment.

As described above, according to the second embodiment of the present invention, since the conductive member 60A includes the first conductive ring 61 contacting the bearing support part 41a of the molded resin part 41, and the connecting part 68 connecting the first conductive ring 61 and the bracket 30 to each other, current flowing through the first bearing 28 and the second bearing 29 can be reduced, and occurrence of electrolytic corrosion can be suppressed. Further, since the conductive member 60A includes no second conductive ring 62, the structure of the conductive member 60A can be simplified.

Further, since the molded resin part 41 includes the bearing support part 41a as in the first embodiment, high coaxiality is obtained between the stator 42 and the shaft 27, the rotation accuracy of the motor 100 can be enhanced, and noise and vibration can be suppressed. In addition, since the conductive member 60A includes the engaging part 66 engaging with the groove part 33 of the bracket 30, the conductive member 60A can be securely attached to the molded stator 40.

In this regard, the shape of the conductive member 60 (60A) is not limited to those illustrated in FIGS. 1, 8 and 10, and any shape is applicable as long as the conductive member 60 contacts the bearing support part 41a of the molded resin part 41 and the bracket 30.

(Air Conditioning Apparatus)

Figure 11:
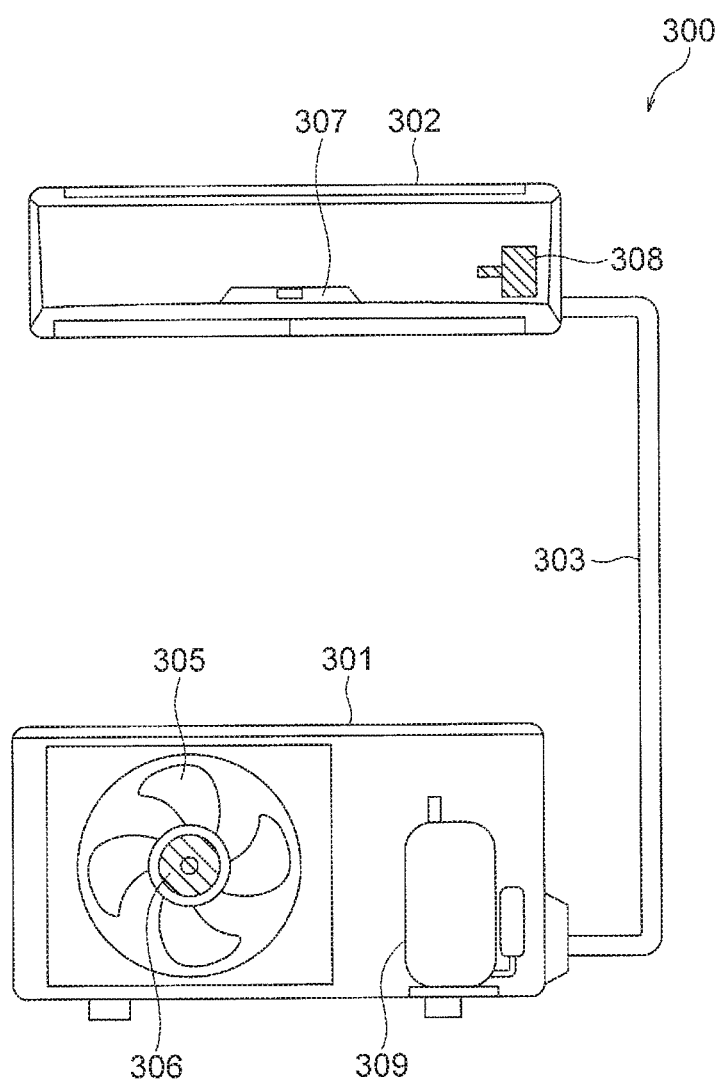
FIG. 11 is a view illustrating an exemplary configuration of an air conditioning apparatus to which the motor in the first or second embodiment is applied.

Next, an exemplary configuration of an air conditioning apparatus to which the motors 100 and 101 in Embodiments 1 and 2 of the present invention are applicable will be described. FIG. 11 is a view illustrating an exemplary configuration of an air conditioning apparatus 300 to which the motors 100 and 101 in Embodiments 1 and 2 are applicable.

The air conditioning apparatus 300 includes an outdoor unit 301, an indoor unit 302, and a refrigerant pipe 303 connecting these units to each other. The outdoor unit 301 includes a first fan 305 and a first motor 306 which rotates an impeller of the first fan 305. The indoor unit 302 includes a second fan 307 and a second motor 308 which rotates an impeller of the second fan 307. In this regard, FIG. 11 also illustrates a compressor 309 which compresses refrigerant in the outdoor unit 301.

At least one of the first motor 306 and the second motor 308 is constituted by the motor 100 described in the first embodiment or the motor 101 described in the second embodiment. As described above, since the motors 100 and 101 are capable of suppressing occurrence of electrolytic corrosion, suppressing noise and vibration, and suppressing rise in manufacturing cost, performance and quality of the air conditioning apparatus 300 can be enhanced, and the rise in manufacturing cost can be suppressed.

The motors 100 and 101 described in Embodiments 1 and 2 can also be mounted on electrical appliances other than the air conditioning apparatus.

While the preferred embodiments of the present invention have been described in detail above, the present invention is not limited to the above described embodiments, and various changes or modifications may be made without departing from the scope of the present invention.

What is claimed is:

1. A motor comprising:
   a rotor having a shaft;
   a stator provided so as to surround the rotor;
   a first bearing and a second bearing rotatably supporting the shaft and disposed at a distance from each other in an axial direction of the shaft;
   a molded resin part covering the stator and having a bearing support part supporting the first bearing;
   a bracket attached to the molded resin part, supporting the second bearing, and having conductivity; and
   a conductive member provided in contact with both of the bearing support part and the bracket,
   wherein the bearing support part of the molded resin part has an outer circumferential surface having an annular shape about a central axis line of the shaft; and
   wherein the conductive member has:
   a first annular part contacting the outer circumferential surface of the bearing support part; and
   a strip-shaped connecting part extending from the first annular part to the bracket and contacting the bracket.

2. The motor according to claim 1, wherein the molded resin part has an insertion hole in which the rotor is inserted, and
   wherein the bracket is attached to the insertion hole in which the rotor is inserted.

3. The motor according to claim 1, wherein the bracket has a cylindrical part supporting the second bearing, and the cylindrical part has an outer circumferential surface having an annular shape about the central axis line of the shaft.

4. The motor according to claim 3, wherein the conductive member has a second annular part contacting the outer circumferential surface of the cylindrical part, and
   wherein the connecting part connects the first annular part and the second annular part to each other.

5. The motor according to claim 1, wherein the connecting part of the conductive member extends along an outer circumferential surface of the molded resin part.

6. The motor according to claim 3, wherein the connecting part of the conductive member does not reach the cylindrical part of the bracket.

7. The motor according to claim 1, wherein the connecting part of the conductive member has an engaging part engaging with the bracket, and
wherein the bracket has an engaged part engaged with the engaging part of the conductive member.

8. The motor according to claim 7, wherein the bracket has a disk part covering an insertion hole of the molded resin part in which the rotor is inserted, and
wherein the engaged part of the bracket is a groove part formed in the disk part.

9. The motor according to claim 1, further comprising a board attached to the stator,
wherein the molded resin part is disposed so as to cover the stator and the board.

10. The motor according to claim 1,
wherein the conductive member is made of a metal.

11. The motor according to 10 claim 1, wherein the bracket is made of a metal.

12. The motor according to claim 1, wherein the molded resin part is made of a thermosetting resin.

13. The motor according to claim 1, wherein the rotor has a resin part attached to the shaft, and a magnet supported by the resin part, and
wherein the stator has a stator core provided so as to surround the rotor, and a coil wound around the stator core.

14. An air conditioning apparatus comprising:
an outdoor unit having a first fan, and a first motor to drive the first fan;
an indoor unit having a second fan, and a second motor to drive the second fan; and
a refrigerant pipe connecting the outdoor unit and the indoor unit,
wherein at least one of the first motor and the second motor comprises:
a rotor having a shaft;
a stator provided so as to surround the rotor;
a first bearing and a second bearing rotatably supporting the shaft and disposed at a distance from each other in an axial direction of the shaft;
a molded resin part covering the stator and having a bearing support part supporting the first bearing;
a bracket attached to the molded resin part, supporting the second bearing, and having conductivity; and
a conductive member provided in contact with both of the bearing support part and the bracket,
wherein the bearing support part of the molded resin part has an outer circumferential surface having an annular shape about a central axis line of the shaft; and
wherein the conductive member has:
a first annular part contacting the outer circumferential surface of the bearing support part; and
a strip-shaped connecting part extending from the first annular part to the bracket and contacting the bracket.

* * * * *